(12) United States Patent
Van Doren et al.

(10) Patent No.: US 7,177,987 B2
(45) Date of Patent: Feb. 13, 2007

(54) SYSTEM AND METHOD FOR RESPONSES BETWEEN DIFFERENT CACHE COHERENCY PROTOCOLS

(75) Inventors: Stephen R. Van Doren, Northborough, MA (US); Gregory Edward Tierney, Chelmsford, MA (US); Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 10/760,436

(22) Filed: Jan. 20, 2004

(65) Prior Publication Data

US 2005/0160230 A1     Jul. 21, 2005

(51) Int. Cl.
G06F 12/00        (2006.01)
G06F 13/00        (2006.01)

(52) U.S. Cl. .......................... 711/146; 711/3; 711/119; 711/134; 711/140; 711/142; 711/143; 711/144; 711/145; 711/151; 711/150

(58) Field of Classification Search ...................... None
See application file for complete search history.

(56) References Cited

U.S. PATENT DOCUMENTS

| | | | |
|---|---|---|---|
| 5,802,577 A | 9/1998 | Bhat et al. | |
| 5,829,040 A | 10/1998 | Son | |
| 5,875,467 A | 2/1999 | Merchant | |
| 5,875,472 A | 2/1999 | Bauman et al. | |
| 5,958,019 A | 9/1999 | Hagersten et al. | |
| 6,055,605 A | 4/2000 | Sharma et al. | |
| 6,085,263 A | 7/2000 | Sharma et al. | |
| 6,108,737 A | 8/2000 | Sharma et al. | |
| 6,345,342 B1 | 2/2002 | Arimilli et al. | |
| 6,457,100 B1 | 9/2002 | Ignatowski et al. | |
| 6,490,661 B1 | 12/2002 | Keller et al. | |
| 6,631,401 B1 | 10/2003 | Keller et al. | |
| 2001/0034815 A1 | 10/2001 | Dungan et al. | |
| 2002/0009095 A1 | 1/2002 | Van Doren et al. | |
| 2002/0073071 A1 | 6/2002 | Pong et al. | |
| 2002/0129211 A1* | 9/2002 | Arimilli et al. | ............. 711/146 |
| 2003/0018739 A1 | 1/2003 | Cypher et al. | |
| 2003/0140200 A1 | 7/2003 | Jamil et al. | |
| 2003/0145136 A1 | 7/2003 | Tierney et al. | |
| 2003/0195939 A1 | 10/2003 | Edirisooriya et al. | |
| 2003/0200397 A1 | 10/2003 | McAlister et al. | |
| 2004/0002992 A1* | 1/2004 | Cypher et al. | ............. 707/102 |
| 2005/0251631 A1* | 11/2005 | Rowlands et al. | .......... 711/145 |

OTHER PUBLICATIONS

Rajeev, Joshi, et al., "Checking Cache-Coherence Protocols with TLA+ ", Kluwer Academic Publishers, 2003, pp. 1-8.

(Continued)

*Primary Examiner*—Mano Fadmanabhan
*Assistant Examiner*—Mardochee Chery

(57) ABSTRACT

Systems and method are disclosed for providing responses for different cache coherency protocols. One embodiment may comprise a system that includes a first node employing a first cache coherency protocol. A detector associated with the first node detects a condition based on responses provided by the first node to requests provided according to a second cache coherency protocol, the second cache coherency protocol being different from the first cache coherency protocol. The first node provides a response to a given one of the requests to the first node that varies based on the condition detected by the detector.

33 Claims, 4 Drawing Sheets

OTHER PUBLICATIONS

Martin, Milo M.K., et al., "Token Coherence: Decoupling Performance and Correctness", ISCA-30, pp. 1-12, Jun. 9-11, 2003.

Acacio, Manuel E., et al., "Owner Prediction for Accelerating Cache-to-Cache Transfer Misses in a cc-NUMA Architecture", IEEE 2002.

Gharachorloo, Kourosh, et al., "Architecture and Design of AlphaServer GS320", Western Research Laboratory, (Date Unknown).

Gharachlorloo, Kourosh, et al., "Memory Consistency and Event Ordering In Scalable Shared-Memory Multiprocessors", Computer Systems Laboratory, pp. 1-14, (Date Unknown).

* cited by examiner

SYSTEM AND METHOD FOR RESPONSES BETWEEN DIFFERENT CACHE COHERENCY PROTOCOLS

RELATED APPLICATIONS

This application is related to the following commonly assigned co-pending patent applications entitled: "CACHE COHERENCY PROTOCOL WITH ORDERING POINTS," Ser. No. 10/760,640, filed Jan. 20, 2004; "SYSTEM AND METHOD FOR RESOLVING TRANSACTIONS IN A CACHE COHERENCY PROTOCOL," Ser. No. 10/760,813, filed Jan. 20, 2004; "SYSTEM AND METHOD TO FACILITATE ORDERING POINT MIGRATION," Ser. No. 10/761,048, filed Jan. 20, 2004; "SYSTEM AND METHOD TO FACILITATE ORDERING POINT MIGRATION TO MEMORY," Ser. No. 10/760,599, filed Jan. 20, 2004; "SYSTEM AND METHOD FOR CREATING ORDERING POINTS," Ser. No. 10/760,652, filed Jan. 19, 2004; "SYSTEM AND METHOD FOR CONFLICT RESPONSES IN A CACHE COHERENCY PROTOCOL WITH ORDERING POINT MIGRATION," Ser. No. 10/760,651, filed Jan. 19, 2004; "SYSTEM AND METHOD FOR READ MIGRATORY OPTIMIZATION IN A CACHE COHERENCY PROTOCOL," Ser. No. 10/761,044, filed Jan. 20, 2004; "SYSTEM AND METHOD FOR BLOCKING DATA RESPONSES," Ser. No. 10/761,034, filed Jan. 20, 2004; "SYSTEM AND METHOD FOR NON-MIGRATORY REQUESTS IN A CACHE COHERENCY PROTOCOL," Ser. No. 10/760,659, filed Jan. 20, 2004; "SYSTEM AND METHOD FOR CONFLICT RESPONSES IN A CACHE COHERENCY PROTOCOL WITH ORDERING POINT MIGRATION," Ser. No. 10/761,073, filed Jan. 20, 2004; "SYSTEM AND METHOD FOR CONFLICT RESPONSES IN A CACHE COHERENCY PROTOCOL," Ser. No. 10/761,047, filed Jan. 20, 2004, all of which are filed contemporaneously herewith and are incorporated herein by reference.

BACKGROUND

Multi-processor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches can snoop broadcast requests to the system. The other caches respond by indicating whether a copy of requested the data is stored in the respective caches. Thus, correct ownership and usage of the data are determined by the collective responses to the broadcast requests.

An ambiguity can exist for a particular data block, such as when more than one processor seeks to access the same data concurrently. A mechanism for detecting whether such an ambiguity exists is known as a conflict. To maintain forward progress in a multi-processor system, the protocol implemented employs a conflict resolution scheme. Additionally, various starvation avoidance measures can be implemented to help ensure forward progress for transactions.

SUMMARY

One embodiment of the present invention may comprise a system that includes a first node employing a first cache coherency protocol. A detector associated with the first node detects a condition based on responses provided by the first node to requests provided to the first node according to a second cache coherency protocol. The second cache coherency protocol is different from the first cache coherency protocol. The first node provides a response to a given one of the requests to the first node that varies based on the condition detected by the detector.

Another embodiment of the present invention may comprise a multi-processor system that includes a requesting processor node that provides a source broadcast request for desired data to the system according to a broadcast-based cache coherency protocol. Another processor node employs a forward progress cache coherency protocol for a pending transaction for the desired data. The another processor node provides a first type of conflict response to the source broadcast request for the desired data while in a first operating mode for the pending transaction for the desired data. The first type of conflict response permits the source broadcast request for the desired data to make forward progress according to the broadcast-based cache coherency protocol. The another processor node switches to a second operating mode after providing at least one of the first type of conflict responses. The another processor node provides a second type of conflict response to the source broadcast request for the desired data while in the second operating mode for the pending transaction for the desired data.

Yet another embodiment of the present invention may comprise a method that includes providing a first type of conflict response from a target node in response to receiving a request for data at the target node while the target node employs a first cache coherency protocol for a pending transaction for the data. The request for the data being provided by a requester according to a second cache coherency protocol. After a predetermined condition has been met, a second type of conflict response is provided from the target node. The second type of conflict response is provided in response to receiving each subsequent request for the data at the target node while the target node employs the first cache coherency protocol for the pending transaction.

DETAILED DESCRIPTION

This disclosure relates generally to systems and method for conflict responses between different cache coherency protocols. The approach described herein, for example, can enable combining a broadcast-based cache coherency protocol with a forward progress cache coherency protocol, such as a null-directory or directory-based protocol. By way of example, the approach enables forward progress of one or more requests employing the broadcast based protocol in conflict situations when one or more concurrently pending forward progress protocol requests exist for the same line of data. The interaction between the protocols can occur during migration of a cache ordering (or serialization) point from one cache to another cache according to the broadcast-based protocol.

As used herein, a node that issues a request, such as a read or write request, defines a source node. Other nodes in a system are potential targets of the request. Additionally, each memory block can be assigned a home node that maintains necessary global information and a data value for that memory block. The types of information maintained at the home node generally depend on the particular protocols supported by the system.

Figure 1:
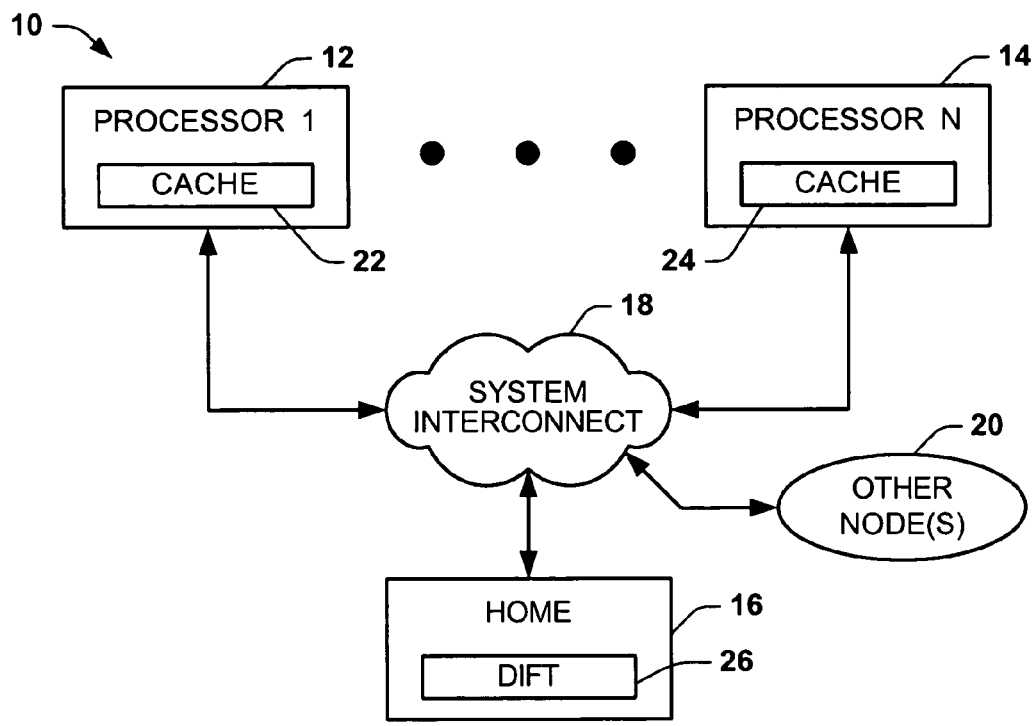
FIG. 1 depicts an example of a multi-processor system.

FIG. 1 depicts an example of a system 10 that implements a hybrid cache coherency protocol. The system 10 includes a plurality of processors 12 and 14 (indicated at PROCESSOR 1 through PROCESSOR N, where N is a positive integer (N>1)). The system 10 also includes a home node 16 that can be implemented in memory. The memory provides a single shared address space for the system 10. The memory can include one or more memory storage devices (e.g., dynamic random access memory (DRAM)).

The processors 12 and 14 and a home node 16 define nodes in the system 10 that can communicate with each other via a system interconnect 18. For example, the system interconnect 18 can be implemented as a switch fabric or a hierarchical switch. Also associated with the system 10 can be one or more other nodes, indicated schematically at 20. The other nodes 20 can correspond to one or more additional processors or other multi processor systems (e.g., one or more symmetric multi-processor (SMP) nodes) connected to the system interconnect 18, such as through an appropriate interconnect interface (not shown).

Each of the processors 12, 14 includes at least one corresponding cache 22 and 24. For purposes of brevity, each of the respective caches 22 and 24 is depicted as a unitary memory structure, although each cache may include a plurality of memory devices or different cache levels. Each of the caches 22 and 24 includes a plurality of cache lines. Each cache line has an associated tag address that identifies corresponding data stored in the line. The system 10 employs the caches 22 and 24 and the home node 16 to store blocks of data, referred to as "memory blocks." A memory block can occupy part of a memory line, an entire memory line or span across multiple lines. For purposes of simplicity of explanation, however, it will be assumed that a memory block occupies a single "memory line" in memory or a "cache line" in a cache.

Each cache line can also include information identifying the state of the data stored in the respective cache. A given memory block can be stored in a cache line of one or more of the caches 22 and 24 as well as in a memory line of the home node 16, depending on the state of the line. Whether a cache line contains a coherent copy of the data depends on the state of the cache line. Certain states employed by the coherency protocol can define a given cache line as an ordering point for use in the broadcast-based protocol implemented by the system. In a forward progress protocol (FPP), the home node (e.g., memory) 16 operates as the ordering point for a given line of data.

As mentioned above, the system 10 implements a hybrid cache coherency protocol to manage the sharing of memory blocks so as to ensure coherence of data. The coherency protocol establishes rules for transitioning between states, such as if data is read from or written to the home node 16 or one of the caches 22 and 24. In the hybrid protocol, for example, a given request is initially issued using a primary broadcast-based protocol. A broadcast-based protocol, such as a broadcast source snoopy protocol, provides that a source node initially broadcasts snoops or requests directly to all other nodes in the system 10. The broadcast-based protocol can be characterized by low occupancy. For example, a snoop issued in a request channel according to the broadcast-based protocol does not block at target nodes, but returns messages in a corresponding response channel (e.g., a two-hop protocol). Forward progress of a data request issued in the broadcast-based protocol can be ensured by the hybrid protocol since failing transactions (e.g., in conflict situations or when requests otherwise fail) are not retried in the broadcast-based protocol, but instead are implemented using corresponding commands according to the forward progress protocol.

In the forward progress protocol, a source node issues a request to a home node that responds by issuing one or more snoops (or probes) to other nodes in the system 10. The forward progress protocol can correspond to any type of protocol designed to ensure forward progress for processing requests to completion without deadlocking. The forward progress protocol can utilize known starvation avoidance and deadlock avoidance mechanisms. Common examples of a forward progress protocol include a null-directory cache coherency protocol and a directory-based cache coherency protocol.

In a null-directory-based protocol, the home node 16 corresponds to a shared memory structure that receives a request from a source node. The home node 16 creates an entry in a directory-in-flight table (DIFT) 26 and then snoops the system 10 for a coherent copy of the requested data. The DIFT 26 manages responses to the system snoops issued by the home node 16 based on the rules defined in the protocol. The DIFT 26 also limits the number of outstanding snoops that are allowed to progress beyond the home node 16 operating as the ordering point. For example, the DIFT 26 can buffer source requests at the home node 16 and send one snoop to the system 10 at a time.

In a standard directory-based protocol, the home node 16 also includes a directory (not shown) that contains information identifying where in the system 10 a coherent copy of the data should be located for each memory block. While a single home node 16 is depicted in FIG. 1, any number of one or more nodes and memory structures could be utilized.

Those skilled in the art will appreciate various null-directory and directory-based cache coherency protocols could be utilized as the secondary protocol by the system 10. Since it is possible that both protocols can run in the system 10 concurrently, the hybrid protocol facilitates interaction between the two protocols.

The protocol defines the available states and possible state transitions at each respective node 12, 14, 16, 20. Additionally, the type of response and whether a response will be provided depends upon the type of request, as well as the state of the identified memory block contained in the responding nodes. A set of cache states that can be implemented by the system 10 for a respective cache line is depicted below in Table 1. Since there are eight possible states, the state information can be encoded by a three-bit data word, for example.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in the system and may respond to snoops by returning data. |
| F | First (among equals) - The cache line is valid and unmodified by caching processor. Other processors may have valid copies, and caching processor may respond to snoops by returning data. |
| D | Dirty - The cache line is valid and more up-to-date than memory. The cache line has not been modified by the caching processor, and the caching processor has the only cached copy in the system. The caching processor must respond to snoops by returning data and must write data back to memory upon displacement. The dirty state permits a modified block to be transferred between caches without updating memory. |
| M | Modified - The cache line is valid and has been modified by the caching processor. The caching processor has the only cached copy in the system, and the caching processor must respond to snoops by returning data and must write data back to memory upon displacement. |
| O | Owned - The cache line is valid and more up-to-date than memory. The caching processor may have modified the cache line. Other processors may have valid copies, and the caching processor must respond to snoops by returning data and must write data back to memory upon displacement. |
| T | Transition - The cache line is in transition. The cache line may be transitioning from O, M, E, F or D to I, or the line may be transitioning from I to any one of the valid states. |

The state of a cache line can be utilized to define a cache ordering point in the system 10. As used herein, an ordering point defines a serialization of requests to the same memory line (or memory block) at a node that is understood and followed by the system 10. In particular, for a broadcast-based protocol implementing the states set forth in Table 1, a cache line having one of the states M, O, E, F or D can serve as a cache ordering point for the data contained in that cache line. The broadcast-based cache coherency protocol implemented by the system 10 enables the ordering point for a given cache line to be transferred from cache of an owner node (the node serving as the current ordering point) to the cache of a destination node to serve as a new ordering point.

The cache line of the owner node can transition to the T-state to help ensure data coherency during ordering point migration to a destination node. The destination node can provide a message to acknowledge when the ordering point has successfully migrated. The T-state can be maintained at the owner node until the owner receives confirmation that the ordering point has successfully migrated to the destination node. The owner node can respond to the acknowledgement message by providing a further acknowledgement message back to the destination node. The cache line of the owner node can then transition from the T-state to the I-state in response to receiving the acknowledgment message from the destination node. The request that initiated the cache-to-cache migration sequence can be considered complete in response to receiving the acknowledgment provided by the owner node. While in the T-state for cached data, the owner node does not respond to requests for cached data by providing data or by indicating a cache miss. Instead, the owner node provides a corresponding-conflict response to requests for the data while in the T-state.

The hybrid protocol implemented in the system 10 permits transactions associated with a given line of data to exist concurrently according to two different protocols, including transactions that involve cache-to-cache ordering point migration employing the broadcast-based protocol. When transactions exist in the system 10 concurrently in two different protocols, a race condition for the data can exist. For example, it is possible for a source-broadcast request to reach a cache ordering point prior to a snoop (in the forward progress protocol) from the home node for the same line of data. When the source-broadcast request is a migratory type of request, which causes the ordering point to migrate to the cache of the requester, it is possible to inhibit forward progress of FPP snoops from the home node. This condition of preventing forward progress of FPP snoops is referred to as "starvation." In the absence of the protocol implementing procedures to manage the interaction between the two protocols, it might be possible for a plurality of consecutive source-broadcast transactions to repeatedly transfer the ordering point from one cache to another cache and thereby starve out a forward progress protocol transaction for the same line of data.

To help manage the interaction between the two protocols, a node employing the forward progress protocol (FPP) for an outstanding transaction is programmed and/or configured to detect a potential starvation condition. A potential starvation condition can exist, for example, when the node employing the forward progress protocol receives a request (or snoop) in the broadcast-based protocol for the same line of data as the outstanding FPP transaction. The node can operate in a first mode to provide a first type of response that permits a number of one or more requests provided in the broadcast-based protocol to proceed before switching to a second operating mode. In the second operating mode, the node employing the forward progress protocol can provide a different type of response to requests provided in the broadcast-based protocol that causes a requester receiving the different type of response to transition to the forward progress protocol without first completing the transaction in the broadcast-based protocol. The number of requests permitted to complete by the node employing the forward progress protocol can be any finite number of requests. For example, the node employing the forward progress protocol can be programmed to permit one or two (or any desired threshold number) of requests in the broadcast-based protocol.

As a result, the hybrid protocol implemented in the system can increase the number of conflict cases that are allowed to complete for requests provided in the broadcast-based protocol without being forced to reissue the requests according to the forward progress protocol. Since more conflict cases can be completed via cache-to-cache data transfer using the broadcast-based protocol, the net effect is reduced latency for such transactions as well as reduced utilization of network resources and memory bandwidth. Those skilled in the art will understand and appreciate that the occurrence of starvation due to interaction of broadcast-based protocol and FPP transactions is generally rare. As such, allowing some limited number of broadcast-based protocol transactions to make forward progress can help improve performance, since the completion time of an additional broadcast-based protocol transaction followed by the FPP transaction will typically be smaller than the completion time for two FPP transactions.

By way of further example, assume that the processor 12 has been caused to employ the forward progress protocol to request the data unavailable from the processor's own local cache 22. As mentioned above, a processor node can transition to operate in the forward progress protocol in response to a previous source broadcast request failing or a conflict condition. The processor 12 provides the request for desired data according to the forward progress protocol, such as by sending an appropriate request to the home node 16. The home node 16 creates a DIFT entry 26 for the request and issues a snoop to the system 10, including to the processor 14 and the other nodes 20.

Assume further that a second processor (e.g., in the other nodes 20) includes a cached copy of the requested data in a state that defines such processor as a cache ordering point for the data. Assume further that a third processor (e.g., the processor 14) has issued a source broadcast request for the same data as the snoop issued from home node 16 requiring transfer of the ordering point to the cache of the third processor (e.g., a migratory type of read request or a write request in the broadcast-based protocol). When the second processor receives the source broadcast request from the third processor (e.g., the processor 14) before the snoop, the second processor can provide an ownership data response to the third processor. The second processor transitions to the T-state in conjunction with providing the ownership data response in the broadcast-based protocol.

Since the processor 12 has an outstanding transaction employing the forward progress protocol when it receives the source broadcast request from the processor 14 for the same line of data, the processor 12 operates in a conflict mode. The conflict mode can vary as a function of responses (e.g., based on the number and/or type of responses) provided by the processor 12. For example, the processor 12 can operate in a first mode in which the processor provides a first type of conflict response that allows the processor 14 (or other processors requesting the data in the broadcast-based protocol) to make forward progress. After the processor 12 has provided a number of responses, which number may indicate a potential starvation condition, the processor 12 can operate in a second conflict mode. In the second conflict mode, the processor 12 can provide second type of conflict response that causes the requester to transfer from the broadcast protocol to the forward progress protocol even in situations when data is returned in response to the source broadcast requester. As a result, the processor 12 will provide conflict responses to all conflicting source broadcast requests while the transaction is pending at the processor 12 in the forward progress protocol.

The second processor (e.g., in the other nodes 20) can also provide a conflict response to the snoop issued by the home node 16 since the processor is in the T-state when the snoop is received. The conflict response from the second processor indicates that the ordering point is being transferred from the processor to another node (e.g., to the processor 14) in the system 10.

Since the ordering point migration involves transferring a copy of data that might be more up-to-date than at the home node 16, the T-State and corresponding conflict response to a forward progress protocol snoop helps to protect against a coherency timing quandary, such as when both the new and old ordering points respond with MISS messages. Such a timing quandary can occur, for example, when the forward progress protocol snoop arrives at the old ordering point after the transition has begun and arrives at the new ordering point before the transition has completed.

In response to receiving the conflict response, the home node 16 sets a conflict condition and reissues the snoops to the system 10. Additionally or alternatively, the home node 16 can set such a conflict condition and reissue the snoops in other situations. For example, the home node 16 can set a conflict condition and reissue the snoops in any situation when no copy of the requested data is returned to the home node 16 in response to the snoops while another copy of the line of data, which may be more current than the memory (e.g., a cached copy), exists in the system 10. The home node 16 can ascertain whether such a cached copy exists based on the responses received to the snoop (e.g., including the conflict response) and/or based on state information that can be maintained at the home node (e.g., in a standard directory-based protocol).

After the home node 16 reissues the snoops, the forward progress protocol ensures that the pending transaction at the source processor 12 can be completed according to the forward progress protocol. The progress associated with the snoops issued from the home node can vary depending on a threshold that sets the number of broadcast-based transactions permitted to proceed while a forward progress protocol transaction is pending at the home node 16. For a threshold that permits one source broadcast request to proceed, one retry by the home node 16 should suffice to complete the forward progress protocol transaction. If the threshold value is greater than one, multiple retries may be required.

Those skilled in the art will appreciate that employing a threshold ensures that the source node eventually transitions to forward progress protocol conflict mode. When the source node transitions to the conflict mode, any other requesters employing the broadcast-based protocol will also be caused to enter the forward progress protocol mode. Consequently, the hybrid protocol provides that all requesters will eventually be in forward progress protocol mode. Because the forward progress protocol includes inherent forward progress capabilities (e.g., starvation and deadlock avoidance mechanisms), it is ensured that processor 12 will make progress. For instance, for a threshold of one while the processor 12 includes the only outstanding broadcast-based transaction, the processor 14 that is operating as the new cache ordering point for the data can provide a data response to the source processor 12 as well as to the home node 16.

From the foregoing example, those skilled in the art will understand and appreciate that the hybrid protocol can permit one or more source broadcast transactions to complete even when a forward progress protocol transaction is pending for the same line of data. By employing a threshold that permits a number (e.g., one or more) of broadcast-based protocol transactions to complete, the perceived latency associated with such transactions can be reduced. The pending forward progress protocol transaction can be ensured that, after the threshold has been reached, all other competing broadcast-based protocol transactions will be forced into the FPP mode. Once in the FPP mode, the protocol's inherent forward progress characteristics can ensure that all transactions will make forward progress and eventually complete. To mitigate excessive starvation of the forward progress protocol transaction, the protocol can switch to a second operating mode and force source broadcast transactions to be reissued in the forward progress protocol. As a result, interaction between the forward progress and broadcast-based protocols is facilitated, including during cache-to-cache ordering point migration that can occur in the broadcast-based protocol.

Figure 2:
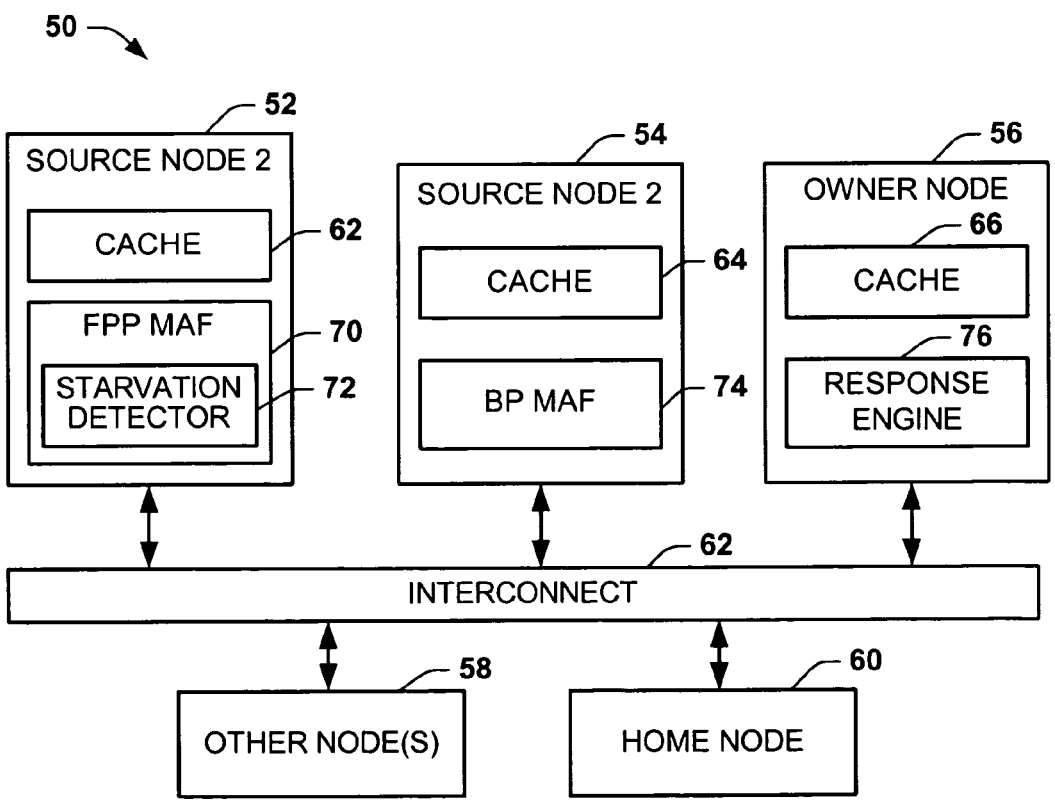
FIG. 2 depicts an example of another multi-processor system implementing a hybrid protocol.

FIG. 2 depicts an example of a multi-processor computing system 50. The system 50, for example, is an SMP node comprising a plurality of processor nodes 52, 54 and 56, as well as other nodes 58 (e.g., corresponding to one or more other processor nodes). The system 50 also includes a home node 60 for a given line of data (e.g., associated with a memory controller). The nodes 52, 54, 56, 58 and 60 communicate with each other via an interconnect 62. The interconnect 62 facilitates transferring data between processors and memory of the system 50. For example, the interconnect 62 can be implemented as a switch fabric or hierarchical switch programmed and/or configured to manage transferring requests and responses between the processors 52, 54 and 56, the other nodes 58 and the memory 60. While four processor nodes 52, 54, 56, 58 and one home node 60 are depicted in the example of FIG. 2, those skilled in the art will appreciate that a greater or smaller number of nodes can be implemented in the system 50.

Each processor nodes 52, 54 and 56 also includes an associated cache 62, 64 and 66, which enables faster access to cached data than from the home node 60. The system 50 implements a cache coherency protocol designed to ensure coherency of data in the system. By way of example, the cache coherency protocol can be implemented as a hybrid protocol that includes a source broadcast protocol in conjunction with a forward progress protocol, such as a null-directory or directory-based cache coherency protocol. The system 50 of FIG. 2, for example, employs the source broadcast protocol to broadcast requests (or snoops) for desired data from a source node. If the source broadcast request fails, such as when a conflict exists, the forward progress protocol can be employed to reissue a corresponding request to the home node 60. Those skilled in the art will appreciate other forward progress techniques that can be utilized to complete the transaction associated with the failing broadcast request.

The home node 60 can be implemented as part of an address space that is shared by the processors 52, 54 and 56 as well as the other nodes 58 of the system 50. The home node 60 can employ a DIFT to manage requests for corresponding data issued to the respective home node memory modules according to the forward progress protocol. A coherent copy of data, for example, may reside in the home node 60 (e.g., associated with a given memory line) or, alternatively, in a cache of one of the processors 52, 54 and 56 or the other nodes 58.

FIG. 2 depicts selected portions of the processor nodes 52, 54 and 56 to facilitate explanation of a conflict that can occur in the system 50 due to interaction between the source broadcast protocol and the forward progress protocol. For instance, assume the processor 52 has issued a request (e.g., via a virtual request channel) to the home node 60 for a given line of data according to the forward progress protocol. The processor 52 thus has allocated a forward progress protocol (FPP) miss address file (MAF) entry 70 associated with the line of data. As mentioned above, the processor 52 can transition from the broadcast-based protocol to reissue the request in the forward progress protocol when a conflict occurs (e.g., in response to sending or receiving a conflict response) or when a source broadcast request otherwise fails.

The home node 60 issues a snoop request (e.g., via a virtual snoop or forward channel) to other nodes in the system according to the forward progress being implemented. For example, in a null-directory protocol the home node 60 can snoop the processors 54, 56 as well as the other nodes 58 via the interconnect 62.

Assume, for example, that the processor 54 also requires the same line of data as the processor 52 and that the data is not locally available from the cache 64. The processor 54 allocates a broadcast protocol (BP) MAF entry 74 associated with the line of data and snoops the system 50 for the requested data by issuing a source broadcast request, including the processors 52, 56, the other nodes 58 and the home node 60. Assume further that the processor 56 is an owner of the desired line of data when the source broadcast snoop request from the processor 54 is received, which occurs prior to receiving the snoop from the home node 60 associated with the FPP request from the processor 52. For instance, the processor 56 contains the data in the cache 66 in a state (e.g., M, O, E, F or D) associated with the cached data being requested by both the processors 52 and 56, which state defines that processor as a cache ordering point for such data. Since the source broadcast request from the processor 54 arrives at the processor 56 prior to the snoop from the home node 60, the processor 56 provides an ownership data response to the processor 54.

For example, the processor 56 includes a response engine 76 (e.g., part of a cache controller) associated with the cache 66 that manages responses to requests for data contained in the cache 66. For a cache hit, the response engine 76 retrieves the requested data from the cache 66 and transfers data via the interconnect 62, such that the ordering point migrates from the cache 66 to the cache of the requester. In conjunction with providing the ownership data response, the response engine 76 also performs a corresponding state transition for the line of data in the cache 66 (e.g., to the T-state). The processor 56 may remain in the T-state until the destination processor confirms that the ordering point has successfully migrated. After receiving the cache ordering point, the processor 54 provides a migration acknowledgement (MACK) signal to the processor 56 to acknowledge the ordering point has successfully migrated. The MACK signal enables the processor 56 to transition from the T-state to the I-state. The processor 56 responds to the MACK signal by providing a corresponding MACK acknowledgement (MACK-ACK) response back to the processor 54.

It is further assumed that the processor 52 receives the source broadcast request from the processor 54 while the FPP MAF 70 is outstanding for the same line of data. The starvation detector 72 controls how the processor 52 responds to source broadcast requests for the line of data associated with the FPP MAF 70. While the FPP MAF 70 is outstanding, the starvation detector 72 can ascertain the existence of a potential starvation condition and control the type of responses provided by the processor 52 to such requests.

For example, the starvation detector 72 can enable the processor 52 to operate in a first conflict mode. In the first conflict mode, the processor 52 provides a first type of conflict response source-broadcast transactions that permits a desired number of source broadcast transactions (e.g., a threshold number of one or more) to complete with the requester receiving and utilizing the requested data. After the processor 52 has provided the desired number of responses to source broadcast transactions, the starvation detector 72 can enable the processor 52 to transition to a second conflict mode. In the second conflict mode, the processor 52 provides a second type of conflict response to source-broadcast transactions that causes recipient processors to employ the forward progress protocol.

Continuing with the above example, the processor 52 can provide the first type of conflict response to the source broadcast request provided by the processor 54. As a result, the processor 54 can store the data received from the processor 56 in the cache 64 and utilize the data. After receiving a complete set of responses to the source broadcast request (including the ownership data response), the processor 54 transitions the cached data to a state (e.g., O or D), which defines the processor as a new cache ordering point for the data. As a cache ordering point, the processor 54 can respond to requests for the data, including another source broadcast request.

If another processor, such as at the other nodes 58 or the processor 56, provides a source broadcast request while the FPP MAF 70 still exists for the same line of data, the processor 52 provides a conflict response. The type of conflict response will depend on the conflict mode associated with the FPP MAF 70. As mentioned above, the starvation detector 72 controls the conflict mode of the processor 52, such as according to the number of responses provided to source broadcast requests. Assuming a threshold value of one, the FPP MAF 70 will have transitioned to the second conflict mode after providing the conflict response to the processor 54. In the second conflict mode, the processor 52 provides the second type of conflict response to subsequent source broadcast requests, which will cause the requesting processor to transition to the forward progress protocol. It will be appreciated that the requesting processor can transition to the forward progress protocol either concurrently in response to receiving the second type of conflict response or, alternatively, the requesting processor can transition to the forward progress protocol after having performed corresponding maintenance signaling (e.g., housekeeping) functions. For example, since an ownership data response can include the most-up-to-date (e.g., dirty or owner) copy of the line of data, appropriate maintenance procedures can be implemented to ensure that the home node 60 is updated with the up-to-date data.

In view of the above, the system 50 thus employs a hybrid cache coherency protocol that facilitates interaction between different protocols, such as a forward-progress protocol and a source-broadcast protocol. In particular, the forward progress protocol can be designed to permit a desired finite number of source broadcast requests for a corresponding line of data to proceed before providing a type of response that causes requesting processors to switch over to the forward progress protocol. Therefore, the approach provides for a temporary stall of a request being implemented according to the forward progress protocol to enable a corresponding request for the same line of data to proceed according to the broadcast-based protocol.

Whenever a source broadcast request is issued by a source node, each target node of the system issues a corresponding response. An example list of possible responses that may be included in the cache coherency protocol described herein is provided below in Table 2.

TABLE 2

| Source Broadcast Response | Response Description |
|---|---|
| D-DATA | Ownership data response - Corresponding snoop command was the first to arrive at a cache ordering point (M, O, D, E, F state); the ordering point is being transferred to the requesting processor. One D-Data command can exist per cache line at any given time. |
| S-DATA | Shared data response - A shared copy of data is being returned from a cache ordering point; the ordering point is not being transferred. |
| M-DATA | Memory data response - A copy of data is being returned from home memory. |
| MISS | General snoop response: Snoop failed to match a cache or MAF entry at a snoop target. Snoop matched at a snoop target and invalidated a cache line at the target. Acknowledgement for broadcast invalidate line requests. Acknowledgement for broadcast migration acknowledgement requests. Acknowledgement for broadcast victim write requests. |
| SHARED | Snoop hit shared - Read snoop matched on a cache line in the S-state. |
| CONFLICT | Snoop conflict - Snoop matched a valid MAF (read or write) or T-state cache line at a target processor. |
| FPP | Snoop hit FPP-Mode MAF - Some other processor is trying to access the same cache line and has already transitioned to the forward progress protocol (FPP) mode. This response is utilized for forward progress/starvation avoidance. |

Figure 3:
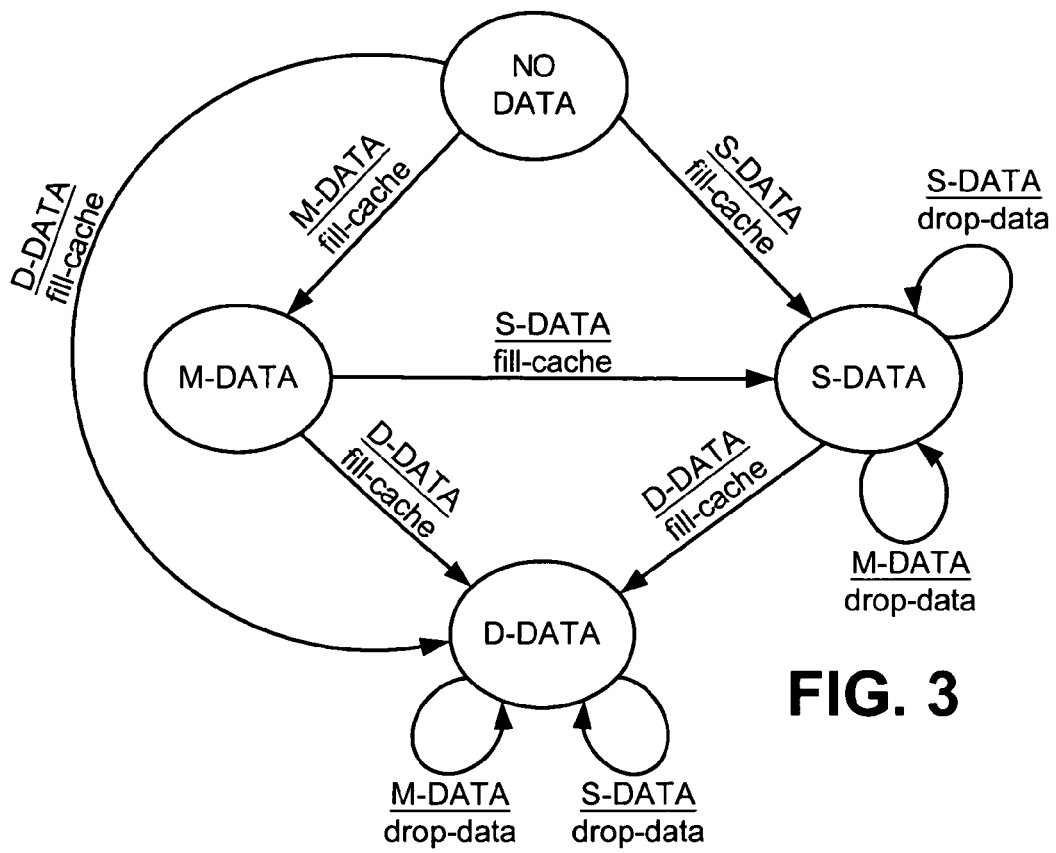
FIG. 3 depicts an example of a state diagram for data responses.

It is possible for more than one copy of data to be returned to a source broadcast request, such as from a cache ordering point and from a home node. Accordingly, a cache controller of a requester (e.g., associated with a MAF) can employ a state machine to manage filling data in the cache of the requester. FIG. 3 depicts an example of a state diagram that represents operation of a data state machine that can be utilized to manage data returned to a requester, including when cache fills can occur. The example of FIG. 3 assumes three types of data that can be returned to a requester, namely S-data, D-data and M-data (e.g., as identified in Table 2).

A processor can provide a data response, including S-data or D-data, when the processor has an ownership state (e.g., M, O, E, F or D) associated with the cached data. When a processor responds with D-data, the ordering point is transferred to the requesting processor. S-data is a shared data response that indicates data is being returned from a cached ordering point, although the ordering point itself is not being transferred to the requester. A shared data response also indicates that a copy of the data may be in one or more other caches. An M-data response can be provided by memory (e.g., a home node) by returning the present value for the data stored in memory. It is possible that the M-data is stale and not up-to-date.

As shown in the state diagram of FIG. 3, D-data overrides both M-data and S-data, meaning that D-data will result in a cache fill, overwriting M-data or S-data that is received prior to the D-data. Additionally, S-data will overwrite M-data, but not D-data. Thus, D-data has priority over M-data and S-data, and S-data has priority over M-data. M-data results in a cache fill only if no other types of data have been received. If a lower priority data is received at a requester, the requester can drop the subsequent, lower priority data.

As noted in Table 2, there are four different types of non-data responses: a general snoop response (MISS), a snoop hit shared response (SHARED), a snoop conflict response (CONFLICT), a snoop read conflict response (RD-CONF), and a snoop hit FPP mode MAF response (FPP). It is thus possible that, in response to a source broadcast request for data, the source processor 12 can receive several different non-data responses. The SHARED, CONFLICT, and FPP non-data responses help account for the fact that there may be more than one source processor issuing requests for the same data at any given time. Accordingly, the source processor 12 (or requester) can employ a conflict state machine to help manage conflicts that may result from any given source broadcast request for data.

Figure 4:
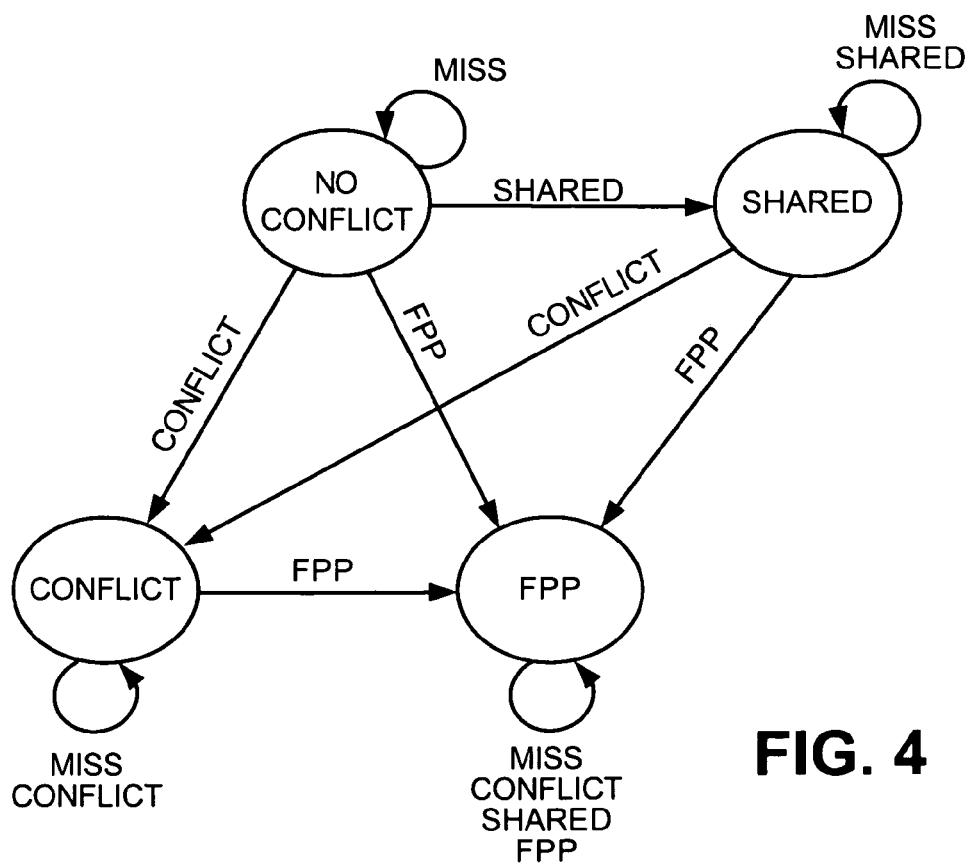
FIG. 4 depicts an example of a state diagram for FPP conflict responses.

FIG. 4 depicts an example of a conflict state diagram that represents operation of a conflict state machine that can be utilized to manage non-data responses returned to a source node. The example data state diagram of FIG. 4 implements non-data responses set forth in Table 2. As shown in the FIG. 4, a FPP is a type of conflict response that has priority over the types of responses, namely the MISS, SHARED, and CONFLICT responses. Thus, the FPP response can transition the conflict state machine to a FPP state, regardless of the other responses received at the source node. The CONFLICT response takes priority over the MISS and SHARED responses and thus transitions the conflict state machine to the CONFLICT state. The SHARED response takes priority over the MISS response and thus transitions the conflict state machine to the SHARED state. The MISS response does not transition the state of the conflict state machine. As shown in the diagram of FIG. 4, once the conflict state machine transitions to a given state, any subsequent lower priority responses will not result in a state transition.

In a conflict state machine associated with a broadcast protocol MAF, the CONFLICT transition may be triggered by receiving a CONFLICT response from a snooped node. The CONFLICT transition may also be triggered by receiving broadcast commands from another node. Examples of broadcast commands that can trigger a CONFLICT transition include: a broadcast read and invalidate line with owner (XRDINVAL) request; a broadcast invalidate line or upgrade an un-writable copy (XUPGRADE) request; a broadcast invalidate (XINVAL) request; and a broadcast memory write-back (XWRITE) request. The CONFLICT transition may further be triggered by receiving a SET-CONF message from the data state machine associated with the MAF.

In a conflict situation, two or more processors each have an outstanding request for the same cache line data and a MAF associated with their respective requests. The response issued by a responding target processor of the group of conflicting processors depends on the MAF state for the conflicting request of the responding target processor. An example list of target processor responses that may be issued in conflict cases according to the cache coherency protocol described herein is depicted below in Table 3.

TABLE 3

| Source Request Type | MAF State at Target | Next MAF State at Target | Response to home | Response to Source |
|---|---|---|---|---|
| Any FFP snoop Any Broadcast Read or Write | Any pending | Queue snoop | deferred | deferred |
| | Any FPP Request (Except Victim) + No starvation | Unchanged | none | CONFLICT |
| | Any FPP Request (Except Victim) + Starvation | Unchanged | none | FPP |
| | Any Victim: XINVAL XMWRITE | Unchanged | none | CONFLICT |
| | Any broadcast read | Per Conflict State Machine (FIG. 4) | none | CONFLICT |
| | Broadcast Writes: XRDINVL XINVLN N XREADM + data state machine = D-DATA CONFLICT | Per Conflict State Machine (FIG. 4) | none | CONFLICT |

As shown in Table 3, a MAF for a given line of data responds to any FPP snoop for the data by queuing the snoop, such as by allocating entry in an incoming request buffer for later processing. The response to the source and to the home node can be deferred until the target can process the request. The deferred response can occur after the target node has received all responses associated with its MAF entry and has completed all tasks associated with the MAF (e.g., caching data and setting cache state).

When a target node has a pending FPP request for the same line of data as a source broadcast request, the response from the target varies based on whether a starvation condition exists. If no starvation condition for the data has been detected for the pending FPP request, the target provides a CONFLICT response to any broadcast read or write request. After a starvation condition has been detected at the target node having an outstanding FPP transaction, the target node provides a FPP response to subsequent source broadcast requests for the requested data. As described herein, starvation for the pending FPP request can vary according to the number of conflict responses provided by the target while the FPP request is pending at the target.

Additionally, if a target node has an outstanding MAF in a FPP victim request state when the source broadcast read or write request is received, the target node issues a CONFLICT response to the source node and the target node MAF state remains unchanged. Also, if a target node has an outstanding MAF in one of the broadcast read or write states set forth in Table 5 when the source broadcast read or write request is received, the target node issues CONFLICT response to the source node and the target node MAF state transitions according to the conflict state machine (see, e.g., FIG. 3).

Once all target nodes (including the home node) have responded to a source broadcast request issued by a source node, the action taken at the source node proceeds according to several factors. These factors include the type of source broadcast request issued by the source node, the resulting state of the data state machine (see, e.g., FIG. 3), and the resulting state of the conflict state machine (see, e.g., FIG. 4).

Figure 5:
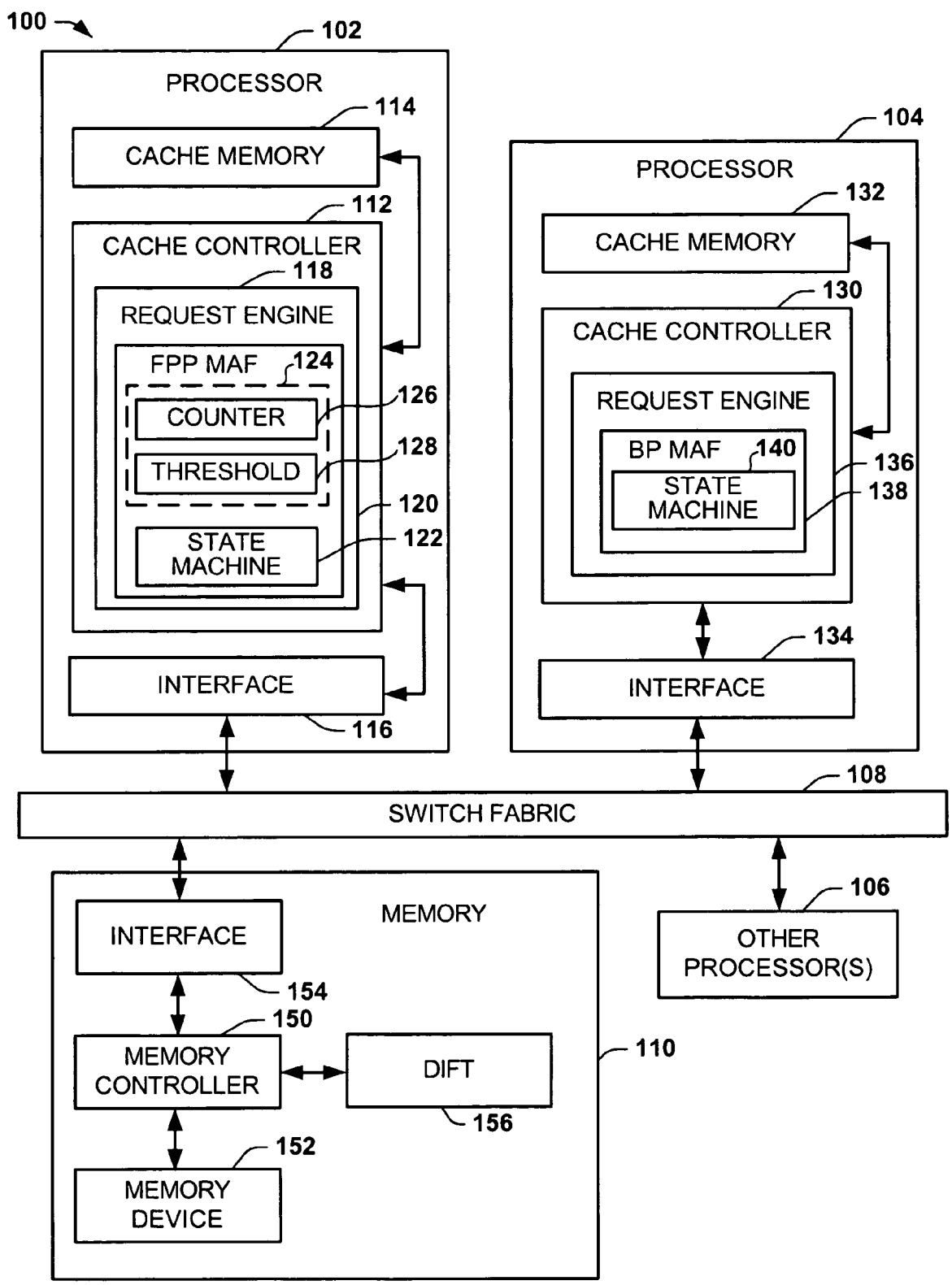
FIG. 5 depicts an example of another multi-processor system implementing a hybrid protocol.

FIG. 5 depicts an example of another multi-processor system 100 that includes a plurality of processors 102, 104 and 106 in communication with each other via a switch fabric 108. The system 100 also includes associated memory 110, which can be organized as a single address space that is shared by the processors 102, 104 and 106 as well as other nodes (not shown). For example, the memory 110 can be implemented as a plurality of separate memory modules, with a variety of module configurations for storing selected data. The system 100, for example, can be implemented as an integrated circuit or as circuitry (e.g., one or more circuit boards) containing plural integrated circuits.

The system 100 employs two different cache coherency protocols, including a primary broadcast-based protocol and a secondary forward progress protocol. The broadcast-based protocol can be a source broadcast cache coherency, in which a source processor 102, 104, 106 can issue a source broadcast request to snoop the system 100, including all other processors in the system and the memory 110. The other processors in the system 100 and the memory 110 respond to the source broadcast request, which results in a cached copy and/or a memory copy of the data being returned to the source processor. In the event that a conflict arises or the source broadcast request otherwise fails, the source processor can retry the request using the forward-progress protocol or by implementing other forward progress techniques.

The forward progress protocol can be a null-directory or a directory-based protocol. For example, the memory 110 can include a home node for each respective line of data that serves as an ordering point for the data. A source node issues a request to the home node for such data. The home node operates as static ordering point for requested data since all requests are sent to the home node for ordering to process the transaction. The forward progress protocol tends to add an additional hop (e.g., increased latency) for the majority of references compared with the broadcast-based protocol, as described above. If the system 100 employs a standard directory-based protocol, ordering is implemented at the home node, but the memory 110 employs an associated directory at the home node to facilitate locating the data (e.g., based on the directory state associated with the requested data). In a standard directory protocol, there will also be circumstances when the directory indicates that there are no cached copies, and thus the home node can respond with the data without issuing any snoops to the system 100. For purposes of brevity, the following description of FIG. 3 assumes the forward progress protocol is implemented as a null-directory protocol.

The processor 102 includes a cache controller 112 associated with cache memory 114. The cache memory 114 contains a plurality of cache lines that include one or more memory blocks. A tag address and state information are associated with each cache line to facilitate access to the cache lines by the cache controller 112. Examples of states that can be associated with each cache line in the cache memory 114 are identified above in Table 1.

The cache controller 112 controls and manages access to the cache memory 114, including requests for data and responses to requests from other nodes. The cache controller 112 communicates requests and responses to the system 100 via a switch interface 116 that is coupled with the switch fabric 108. The switch interface 116, for example, includes an arrangement of queues (e.g., input and output queues or buffers) or other data structures that organize both requests and responses issued by the processor 102 as well as requests and responses provided to the processor 102 for execution.

The cache controller 112 employs a request engine 118 to manage requests issued by the processor 102. The request engine 118 includes a miss address file (MAF) 120 that contains MAF entries for outstanding requests associated with a subset of the locations in the cache memory 114. The MAF 120 manages requests issued by the processor 102 as well as responses to such requests. The MAF 120 can be implemented as a table, an array, a linked list or other data structure programmed to manage and track requests for each cache line. The request engine 118 can contain one or more MAFs, such as one for each of the two protocols implemented in the system 100. For example, each MAF can be programmed to execute program instructions based on a predefined set of rules for the respective protocol. Accordingly, the request engine 118 allocates entries in a given MAF depending on whether the associated request is issued in the forward progress protocol or in the broadcast-based protocol.

By way of example, assume that the processor 102 allocates a FPP MAF entry in the MAF 120 to acquire a line of data employing the forward progress protocol. The FPP MAF entry can include fields that identify the address of the data being requested, the type of request, and response information (e.g., including data) received from other nodes in response to the request. As mentioned above, a request can be issued in the forward progress protocol when a prior source broadcast request for the data fails or when forced into the forward progress protocol in response to a FPP conflict response. The request engine 118 communicates the request to the memory 110 via the interface 116 and the switch fabric 108.

The MAF entry can include one or more state machines, indicated at 122. The state machine 122 can control the state of the MAF entry, such as based on the FPP request, responses received for the request as well as other requests received for the same line of data. The processor 102 thus can respond to requests for the data based on the state of the MAF entry (See, e.g., Table 3) as determined by the state machine 122.

The request engine 118 can also employ a starvation detector 124 operative to detect a starvation condition associated with the FPP MAF entry. The starvation detector 124 enables the request engine 118 to differentiate between conflict conditions that can be considered generally non-disruptive (associated with a first conflict state for the MAF entry) and other conflict conditions that might starve out the FPP MAF entry (associated with a second conflict state for the MAF entry). The request engine 118 thus can control the conflict state associated with the FPP MAF entry based on whether a starvation condition has been detected.

In the example of FIG. 5, the starvation detector 124 includes a counter 126 that is operative to track responses provided by the processor 102 to source broadcast requests for the same line of data as the outstanding FPP MAF entry in the MAF 120. For instance, the counter 126 can be initialized to zero when the FPP MAF entry is allocated and increment (e.g., by adding one) for each CONFLICT response provided to a source broadcast request while the FPP MAF entry is pending. A threshold 128 can be set to a predetermined value that defines when to transition from the first conflict state to the second conflict state.

After transitioning to the second conflict state, the processor can provide FPP conflict responses to all subsequent source broadcast requests for the data. The threshold 128, for example, can be set to a value of one or more. As another example, the threshold 128 can be set to value functionally related to the number of nodes in the system (e.g., perhaps to X−1, where "X" denotes the number of nodes). After the request associated with the FPP MAF entry is completed according to the forward progress protocol, the MAF entry can be retired together with the counter 126 and the state machine 122 associated with the MAF entry. The same or different thresholds can be utilized for FPP MAF entries associated with different respective data requests.

The cache controller 112 also controls responses provided by another processor implementing the forward progress protocol. For example, the cache controller 112 can place a request that was issued using the forward progress protocol in a queue (or buffer) for subsequent processing by the processor 102.

The cache controller 112 also is programmed and/or configured to control the state of each cache line in the cache memory 114 and implements state transitions for the cache lines based on predefined rules established by the cache coherency protocol(s) implemented in the system 100. The cache controller 112 can implement a state transition for an associated cache line in response to a request or other command. Examples of cache state transitions that can occur for a source processor in the system 100 for selected commands in non-conflict situations are provided in Table 4. The commands beginning with the term "broadcast" generally correspond to broadcast snoop commands implemented within the context of the source broadcast protocol. Most of the other commands (not beginning with "broadcast") are examples of typical commands that can be implemented within the context of the forward progress protocol (e.g., null-directory protocol), also implemented by the system 100.

TABLE 4

| Command | Current State | | | Next State | | | |
|---|---|---|---|---|---|---|---|
| | Source | Owner | Sharer | Source | Owner | Sharer | Memory |
| Broadcast non-migratory read request | I | I | I | E or F | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | S | O | I | |
| | I | O | I | S | O | I | |
| | I | O | S | S | O | S | |
| Broadcast migratory read request | I | I | I | E | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | D | I | I | |
| | I | O | I | S | O | I | |
| | I | O | S | S | O | S | |
| Broadcast incoherent read - read current data | I | I | I | I | I | I | |
| | I | I | S | I | I | S | |
| | I | E | I | I | E | I | |
| | I | F | I | I | F | I | |
| | I | F | S | I | F | S | |
| | I | D | I | I | D | I | |
| | I | M | I | I | M | I | |
| | I | O | I | I | O | I | |
| | I | O | S | I | O | S | |
| Non-migratory read request | I | I | I | E or S | I | I | |
| | I | I | S | S | I | S | |
| | I | E | I | S | S | I | |
| | I | F | I | S | S | I | |
| | I | F | S | S | S | S | |
| | I | D | I | S | S | I | Update |
| | I | M | I | S | S | I | Update |
| | I | O | I | S | S | I | Update |
| | I | O | S | S | S | S | Update |
| Migratory read request | I | I | I | E | S | I | |
| | I | I | S | S | S | S | |
| | I | E | I | S | S | I | |
| | I | F | I | S | S | I | |
| | I | F | S | S | S | S | |
| | I | D | I | S | S | I | Update |
| | I | M | I | E | I | I | Update |
| | I | O | I | S | S | I | Update |

TABLE 4-continued

| Command | Current State | | | Next State | | | Memory |
|---|---|---|---|---|---|---|---|
| | Source | Owner | Sharer | Source | Owner | Sharer | |
| | I | O | S | S | S | S | Update |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | D | I | I | |
| | I | M | I | D | I | I | |
| | I | O | I | D | I | I | |
| | I | O | S | D | I | I | |
| Broadcast invalidate line | F | — | I | E | I | I | |
| | F | — | S | E | I | I | |
| | O | — | I | D | I | I | |
| | O | — | S | D | I | I | |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Invalidate line | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Invalidate line - no data | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Read-modify with update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Cache flush - FPP only | * | * | * | I | I | I | Update |
| Broadcast memory write back | D/M/O | — | I | I | I | I | Update |
| | D/M/O | — | S | I | I | S | Update |
| Port memory write back | D/M/O | — | I | I | I | I | Update |

In FIG. 5, the processor 104 is similar to the processor 102. Briefly stated, the processor 104 includes a cache controller 130 associated with a cache memory 132 that contains a plurality of cache lines. The cache controller 130 controls and manages access to the cache memory 132, including requests for data and responses to requests from other nodes in the system 100. The cache controller 130 communicates requests and responses to the system 100 via a switch interface 134 that is coupled with the switch fabric 108 for organizing requests and responses issued by the processor 104 as well as requests and responses provided to the processor for execution.

The cache controller 130 also employs a request engine 136 to manage requests issued by the processor 104. The request engine 136 includes a BP MAF 138 that contains one or more MAF entries for outstanding source broadcast requests associated with a subset of the locations in the cache memory 132. The BP MAF 138 manages requests issued by the processor 104 as well as responses to such requests. While the BP MAF 138 is depicted in FIG. 5 as being associated with a broadcast-based protocol, those skilled in the art will appreciate that the request engine 136 can contain one or more MAFs, such as one for each of the protocols implemented in the system 100.

By way of further example, assume that the processor 104 is implementing the broadcast-based protocol for a request to obtain the same line of data as the processor 102 is implementing in the forward progress protocol. Thus, the MAF entry is created in the BP MAF 138 for the request associated with a source broadcast request associated with the data. The MAF entry includes one or more state machines, indicated at 140, that determine what actions are to occur based on the request issued, the responses received for the request (e.g., Table 4) and the state transition requirements provided by the broadcast-based protocol (see e.g., FIGS. 3 and 4).

The state machine 140 can include multiple components for processing responses to the associated request, such as a data state machine (See, e.g., FIG. 3) for processing data responses and a conflict state machine (See, e.g., FIG. 4) for processing non-data responses. For example, after a complete set of responses has been received by the processor 104 in response to the source broadcast request, the request engine 136 employs the data state machine and the conflict state machine to determine what actions to implement. The actions can include, for example, a cache fill, a state transition as well as transitioning to the forward progress protocol, such as in certain conflict situations. The other processors 106 can be configured to operate similarly to the processors 102 and 104 described above.

Even though the processor 102 may have an outstanding FPP MAF entry for the same line of data, forward progress may be made for the source broadcast request issued by the processor 104 if the processor 102 is in the first conflict state. As mentioned above, the processor 102 provides a CONFLICT response to a source broadcast request when operating in the first conflict state. The first conflict state corresponds to a non-starvation condition for the FPP MAF entry, as established by the threshold 128. After a starvation condition is determined for the FPP MAF entry, the FPP MAF 120 will provide a FPP conflict response to all subsequent source broadcast request. The particular action implemented by the requesting processor 104 in response to either the CONFLICT or FPP conflict response will depend on the type of source broadcast request and the state of the BP MAF entry after all responses have been received.

The memory 110 includes a memory controller 150 programmed and/or configured to service transactions by accessing one or more associated memory storage devices (e.g., random access memory (RAM)) 152. The memory controller 150 communicates requests and responses with other nodes in the system 100 via an interface 154 coupled to the switch fabric 108. The memory controller 150 operates to process a given transaction according to the type of protocol associated with the transaction. For example, in response to a source broadcast request in the broadcast-based protocol, the memory controller 150 accesses the memory device 152 for a corresponding home node and provides an appropriate response to the requester through the interface 154.

The memory controller 150 can also operate according to the forward progress protocol (e.g., a null-directory or directory-based protocol) by employing a DIFT 156 that includes one or more DIFT entries to manage one or more respective requests for a given line of data. For example, a DIFT entry is allocated in the DIFT 156 for each request issued to the home node for a given line of data and issues one or more snoops the system 100. The home node employs the DIFT 156 to serialize or order the request according to the forward progress protocol. Each DIFT entry can include fields identifying, for example, a tag address for a line of data, a processor identifier that identifies a requesting or source processor, a transaction identifier that uniquely identifies a given transaction (and transaction type) as well as state information associated with the request.

In FIG. 5, the DIFT 156 can also track responses to snoops by the memory controller 150 for each DIFT entry allocated for transactions in the forward progress protocol. The DIFT 156, also controls the state information associated with each DIFT entry and implements appropriate action based on the requests and responses for respective DIFT entries. One action that can be implemented in the forward progress protocol is to set a conflict condition based on responses received for a given DIFT entry. In particular, the state machine 152 can include a transition state that helps manage a cached ordering point that is migrating from one cache to another cache in the system 100, such as can occur using the broadcast-based protocol. An associated state machine can transition the state of a DIFT entry to the transition state in response to receiving the conflict response from a processor having the T-state for the requested line of data.

The T-state operates to prevent potentially stale memory data from being returned to the memory controller 150 in response to a request issued in the forward progress protocol when all other responses are MISS responses. All MISS responses can be provided, for example, when, as a result of timing relationships in an unordered network, the most up-to-date copy of a line of data item is cached, but where no owner was identified by the responses to the snoop issued by the home node in the forward progress protocol (e.g., associated with ordering point migration). Accordingly, when a conflict response is received, the memory controller 150 can reissue snoops to the system 100 via the interface 154 for a cached copy of the data identified by the tag address in the DIFT entry. The reissued snoops can result in a data response being returned from cache. Alternatively, if one of the snoops from the home node finds an outstanding MAF entry in the broadcast-based protocol, the FPP snoop can be queued at the MAF entry or a T-state conflict response can be provided. After the MAF entry at the node retires, the queued FPP snoop can be serviced, such as by returning data or a MISS response based on the state of the data.

Figure 6:
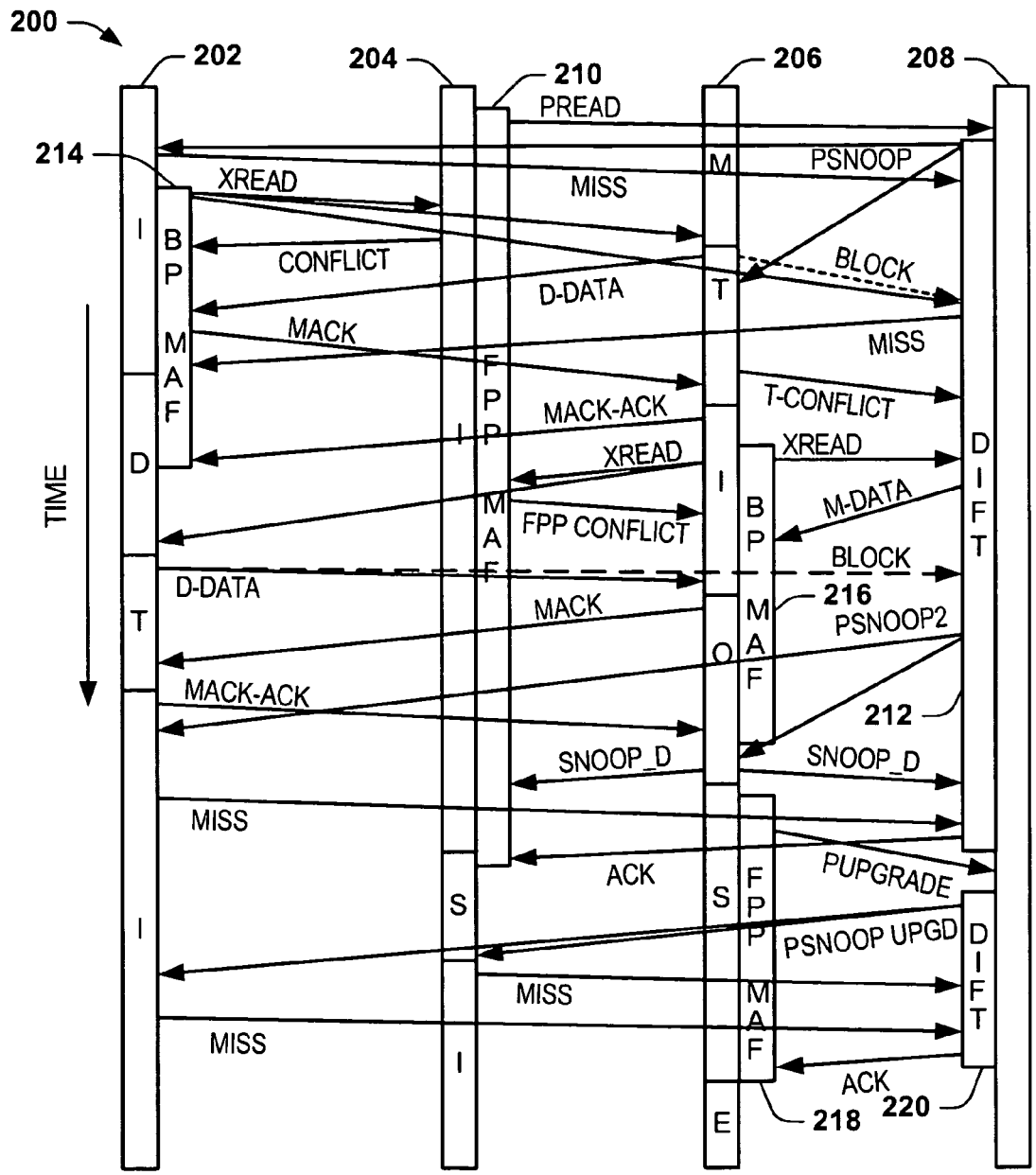
FIG. 6 depicts a first example of conflict management implementing a hybrid protocol.
Figure 7:
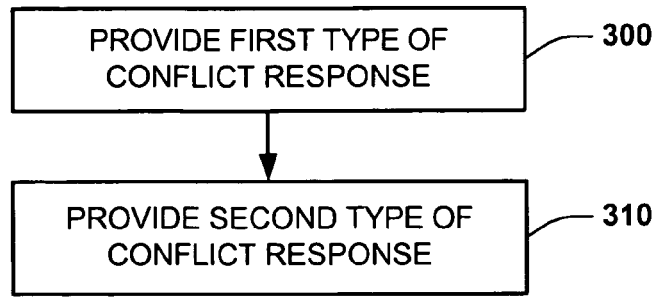
FIG. 7 depicts a flow diagram illustrating a method.

In view of the foregoing structural and functional features described above, certain methods that can be implemented using a hybrid cache coherency protocol will be better appreciated with reference FIGS. 6 and 7. The example in FIG. 6 corresponds to a timing diagram illustrating various interrelationships between requests and responses and state transitions that can occur for a given memory address (e.g., memory line) in different processor caches or memory devices. In each of these examples, time flows in the direction of an arrow labeled "TIME." Those skilled in the art may appreciate various other cases that can be implemented using the coherency protocols described herein. The example in FIG. 6 is described with the forward progress protocol being implemented as a null-directory protocol; although, other directory-based protocols could also be utilized. Additionally, the following methodologies can be implemented by hardware (e.g., as one or more integrated circuits or circuit boards containing a plurality of microprocessors), software (e.g., as executable instructions running on one or more processors or controllers), or any combination thereof.

FIG. 6 depicts an example of a network 200 that facilitates interaction between different cache coherency protocols implemented in the network. The network 200 includes processor nodes 202, 204 and 206 and a home node (e.g., implemented in memory) 208. In the example of FIG. 6, the nodes 202 and 204 are initially in the I-state and the node 206 is initially in the M-state, which state defines the node 206 as an owner node containing a cache ordering point for the data represented in FIG. 6.

Assume that the node 204 has previously implemented a request employing the source broadcast protocol implemented in the network 200 that had failed, such as due to a conflict. As a result, the node 204 reissues the request in a forward progress protocol by allocating a FPP MAF 210 and issuing a corresponding read (PREAD) request to the home node 208 (e.g., in a virtual request channel). The home node 208 allocates a DIFT entry 212 associated with the requested data and issues a corresponding SNOOP request to the nodes 202 and 206 (e.g., in a virtual forward channel). The node 202, being in the I-state when it receives the PSNOOP from the home node, provides a corresponding MISS response (e.g., in a virtual response channel).

After responding to the PSNOOP request, the node 202 allocates a BP MAF entry 214 associated with the same line of data as the FPP MAF 210. Thus, the node 202 provides a source broadcast read (XREAD) request to the network 200, including the nodes 204, 206 and 208. Since the node 204 has an outstanding FPP MAF 210 when it receives the READ request according to the source broadcast protocol, the node 204 provides a corresponding CONFLICT response. The FPP MAF 210 is programmed to detect a starvation condition based on the responses provided by the node 204 while the FPP MAF 210 is outstanding. For example, the FPP MAF 210 can operate in a first conflict mode to provide a first type of response, namely a CONFLICT response. The CONFLICT response enables a number of one or more source broadcast requests for the same line of data to complete using the source broadcast protocol. After a predetermined number of first type of CONFLICT responses has been provided, the FPP MAF 210 transitions to a second conflict mode in which a FPP conflict response is provided to subsequent source broadcast requests while the FPP MAF exists. The differentiation between types of conflict responses permits a finite number of source broadcast requests to make forward progress while temporarily starving the FPP request. Assuming a threshold of one permitted response in the first conflict mode, the FPP MAF transitions to the second conflict mode after providing the CONFLICT response to the node 202.

In the example of FIG. 6, the node 206 receives the XREAD request prior to the PSNOOP from the home node. As a result, the node 206 transitions from the M-state to the T-state and provides an ownership data response (D-data) to the node 202. Additionally, the node 206 can provide an optional blocking (BLOCK) message to the home node 208, indicated by a dotted line. The BLOCK message is operative to prevent the home node 208 from returning data to the requesting node 202 if the BLOCK message, such as when the message is received during a period of time that the XREAD request is being queued or processed at the home node 208. When the BLOCK message finds a match, the home node 208 can return a non-data MISS response to the requesting node 202. When the blocking message does not find a match, the home node 208 would provide M-data to the node 202. After receiving all messages from the network 200 in response to the XREAD request, the node 202 can transition from the I-state to the D-state, which state defines the node 202 as a new cache ordering point in the network 200.

In the example of FIG. 6, the PSNOOP request from the home node 208 arrives at the node 206 while in the T-state. As a result, the node 206 responds with a CONFLICT response, thereby indicating that the ordering point associated with the data is being transferred from the cache of the node 206 to the cache of another node (e.g., the node 202). In response to receiving the CONFLICT response from the node 206, the home node 208 will subsequently retry the PSNOOP request, as indicated at PSNOOP2.

Referring back to the transaction associated with the node 202, the node provides a migration acknowledgement (MACK) message to the node 206 to acknowledge receipt of the ownership data response (D-DATA) and that the ordering point has successfully migrated. In response to receiving the MACK message, the node 206 can transition from the T-state to the I-state and respond with an acknowledgement of the MACK message, indicated at MACK-ACK. In response to receiving the MACK-ACK message from the node 206, the node 202 can retire the BP MAF 214.

Assume, at some point after transition to the I-state, the node 206 (or any other node) requires a copy of the line of data. The node 206 thus allocates a BP MAF entry 216 for the required data and issues a corresponding XREAD request (e.g., a migratory read request) to the network 200, including the nodes 202, 204 and 208. The node 202, being in the D-state upon receiving the XREAD request from the node 206, transitions from the D-state to the T-state and provides a corresponding ownership data response (D-data) to the node 206. The node 202 also provides a BLOCK message to the home node 208, which arrives at the home node after the home node has already responded with M-data to the XREAD request. Consequently, the non-matching BLOCK message can be discarded.

Since the FPP MAF 210 is still outstanding when XREAD request from the node 206 is received for the same line of data and the FPP MAF has transitioned to the second conflict mode, the node 204 responds with a FPP CONFLICT response. Those skilled in the art will understand and appreciate that the amount of time or number of responses that can be provided in the first conflict mode can be programmable. After performing the exchange of the MACK and MACK-ACK messages to confirm and acknowledge the ordering point migration to the node 206, the node 206 can retire the BP MAF 216.

The FPP CONFLICT response causes the node 206 to issue a subsequent upgrade (PUPGRADE) command to enable the node 206 to write to the data. Prior to issuing the upgrade command, the PSNOOP2 request from the home node 208 (e.g., the retry of the PSNOOP) is provided to the nodes 202 and 206. Since at the time the PSNOOP2 is request is received at the node 206 while the node 206 is in the O-state, the node can respond with SNOOP data responses (SNOOP_D) to the node 204 and to the home node 208, as depicted in FIG. 6. The node 206 transitions from the O-state to the S-state in response to providing the SNOOP_D responses. The node 202 responds to the PSNOOP2 request by returning an MISS response. The home node 208 also provides an acknowledgement (ACK) to the node 204 in response to the SNOOP_D response, such that the node retires the FPP MAF 210 and transitions from the I-state to the S-state. The home node 208 releases the DIFT entry 212 after receiving the set of responses to the PSNOOP. Those skilled in the art will understand and appreciate various types of forward progress protocols and corresponding actions that can be implemented under these and similar circumstances.

Subsequently, in response to the previously received FPP CONFLICT response, the node 206 allocates an FPP MAF 218 and issues a corresponding upgrade (PUPGRADE) command to the home node 208 employing the forward progress protocol. In response to receiving the PUPGRADE request from the node 206, the home node 208 allocates a DIFT entry 220. The home node 208 then snoops the system 200 by issuing a PSNOOPUPGD request to the nodes 202 and 204. The node 202 responds with a corresponding MISS response. Since the node 204 is in the S-state when the PSNOOPUPGD request is received, the node 204 transitions from the S-state to the I-state and provides the corresponding MISS response. After receiving the set of responses to the PSNOOPUPGD, the home node 208 provides an ACK message to the node 206 and retires the DIFT entry 220. In response to the ACK message from the home node, the node 206 can retire the FPP MAF 218 and transition from the S-state to the E-state. Once in the E-state, the node 206 can utilize the data as required.

FIG. 7 depicts a method that includes providing a first type of conflict response from a target node in response to receiving a request for data at the target node while the target node employs a first cache coherency protocol for a pending transaction for the data, as shown at 300. The request for the data is provided by a requester according to a second cache coherency protocol. The method also includes, after a predetermined condition has been met, providing a second type of conflict response from the target node, as shown at 310. The second type of conflict response is provided in response to receiving each subsequent request for the data at the target node while the target node employs the first cache coherency protocol for the pending transaction.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
    a first node, employing a first cache coherency protocol;
    a detector associated with the first node that detects a condition based on responses provided by the first node to requests provided to the first node according to a second cache coherency protocol, the second cache coherency protocol being different from the first cache coherency protocol, the first node providing a response to a given one of the requests to the first node that varies based on the condition detected by the detector; and
    wherein the first node operates in one of at least a first conflict mode and a second conflict mode while a pending transaction for data exists at the first node employing the first cache coherency protocol, the first node switching from the first conflict mode to the second conflict mode based on the condition detected by the detector.

2. The system of claim 1, wherein the first node provides a non-data conflict response to a source node that provides the given one of the requests to the first node, the non-data conflict response varying based on the condition detected by the detector.

3. The system of claim 2, wherein the first node provides a first type of non-data conflict response that permits the source node to employ the second cache coherency protocol to complete the given one of the requests to the first node in response to the detector detecting an absence of a starvation condition associated with a pending transaction for data at the first node, and the first node provides a second type of non-data conflict response that causes the source node to employ the first cache coherency protocol to complete the given one of the requests to the first node in response to the detector detecting an existence of the starvation condition associated with the pending transaction for the data at the first node.

4. The system of claim 1, wherein the detector further comprises a starvation detector that detects a starvation condition associated with a pending transaction for data at the first node employing the first cache coherency protocol.

5. The system of claim 1, wherein the detector further comprises a counter that tracks a number of responses provided by the first node to the requests to the first node according to the second cache coherency protocol.

6. The system of claim 5, wherein the detector further comprises a threshold that sets the number of responses provided by the first node operative to cause the first node to provide a conflict response that causes a requesting node that provided the given one of the requests to switch from the second cache coherency protocol and to employ the first cache coherency protocol for the given one of the requests.

7. The system of claim 1, wherein the condition detected by the detector corresponds to a starvation condition associated with the pending transaction for the data at the first node employing the first cache coherency protocol.

8. The system of claim 7, wherein the first node provides a first conflict response while in the first conflict mode which enables progression of requests provided according to the second cache coherency protocol.

9. The system of claim 8, wherein the first node provides a second conflict response while in the second conflict mode which causes requests provided according to the second cache coherency protocol to reissue as corresponding requests according to the first cache coherency protocol.

10. The system of claim 1, further comprising:
    a source node that provides the given one of the requests as a source broadcast request for data according to the second cache coherency protocol; and
    an owner node that comprises an associated cache that includes the data in a cache line having a first state that defines the owner node as an ordering point for the data, the owner node receives the source broadcast request for the data and provides an ownership data response to the source node, the source node filling the data in an associated cache line of the source node in response to receiving the ownership data response from the owner node, and the source node transitioning a state of the associated cache line of the source node to define the source node as a new cache ordering point for the data.

11. The system of claim 1, wherein the first cache coherency protocol comprises a forward progress cache coherency protocol.

12. The system of claim 11, wherein the forward progress protocol comprises one of a null-directory cache coherency protocol and a directory-based cache coherency protocol.

13. The system of claim 11, wherein the second cache coherency protocol comprises a source broadcast cache coherency protocol.

14. A multi-processor system comprising:
a requesting processor node that provides a source broadcast request for desired data to the system according to a broadcast-based cache coherency protocol; and
another processor node employing a forward progress cache coherency protocol for a pending transaction for the desired data, the another processor node providing a first type of conflict response to the source broadcast request for the desired data while in a first operating mode for the pending transaction for the desired data, the first type of conflict response permitting the source broadcast request for the desired data to make forward progress according to the broadcast-based cache coherency protocol, the another processor node switching to a second operating mode after providing at least one of the first type of conflict responses, the another processor node providing a second type of conflict response to the source broadcast request for the desired data while in the second operating mode for the pending transaction for the desired data.

15. The system of claim 14, wherein the second type of conflict response causes the requesting processor node to employ the forward progress cache coherency protocol in connection with completing the source broadcast request for the desired data.

16. The system of claim 14, further comprising a detector that detects a quantity of the first type of conflict responses provided by the another processor node, the another processor node switching from the first operating mode to the second operating mode based on the quantity of the first type of conflict responses detected by the detector.

17. The system of claim 16, wherein the detector further comprises a starvation detector that detects a starvation condition associated with the pending transaction for the desired data at the another processor node.

18. The system of claim 17, wherein the starvation detector further comprises a counter that counts the quantity of the first type of conflict responses provided by the another processor node associated with the pending transaction for the desired data.

19. The system of claim 18, wherein the starvation detector further comprises a threshold that defines the number of the first type of conflict responses provided by the another processor node after which the another processor node will switch to the second operating mode.

20. The system of claim 14, wherein each of the first type of conflict response and the second type of conflict response comprises a respective non-data conflict response.

21. The system of claim 14, further comprising:
an owner processor node that comprises an associated cache that includes the desired data in a cache line having a state that defines the owner processor node as a cache ordering point for the data, the owner processor node providing an ownership data response to the source broadcast request for the desired data, the requesting processor node filling the desired data in an associated cache line of the requesting processor node in response to receiving the ownership data response from the owner node, and the requesting processor node transitioning a state of the associated cache line of the requesting processor node to define the requesting processor node as a new cache ordering point for the data.

22. A multi-processor system, comprising:
means for receiving at least one request for a line of data at a target node while the target node is employing a first cache coherency protocol for a pending transaction for the line of data, the at least one request for the line of data being provided according to a second cache coherency protocol;
means for providing a first type of conflict response to the at least one request for the line of data from the target node prior to detecting a starvation condition associated with the pending transaction for the line of data; and
means for providing a second type of conflict response to the at least one request for the line of data from the target node after detecting the starvation condition associated with the pending transaction for the line of data.

23. The system of claim 22, wherein:
the first cache coherency protocol comprises a forward progress cache coherency protocol; and
the second cache coherency protocol comprises a source broadcast cache coherency protocol.

24. The system of claim 22, wherein first type of conflict response permits the at least one request for the line of data to progress according to the second cache coherency protocol.

25. The system of claim 24, wherein second type of conflict response causes the at least one request for the line of data to reissue employing the first cache coherency protocol.

26. The system of claim 22, further comprising means for detecting the starvation condition associated with the pending transaction for the line of data at the target node.

27. The system of claim 26, wherein the means for detecting the starvation condition further comprises means for counting a number of the first type of conflict responses provided from the target node and for enabling the means for providing the second type of conflict response to provide the second type of conflict response after a threshold number of the first type of conflict responses have been provided from the target node.

28. A method comprising:
providing a first type of conflict response from a target node in response to receiving a request for data at the target node while the target node employs a first cache coherency protocol for a pending transaction for the data, the request for the data being provided by a requester according to a second cache coherency protocol; and
after a predetermined condition has been met, providing a second type of conflict response from the target node, the second type of conflict response being provided in response to receiving each subsequent request for the data at the target node while the target node employs the first cache coherency protocol for the pending transaction.

29. The method of claim 28, wherein the predetermined condition corresponds to a starvation condition associated with the pending transaction at the target node.

30. The method of claim 29, the method further comprising counting the first type of conflict responses provided from the target node and providing the second type of conflict response after the predetermined number of the first type of conflict responses have been provided, the counting providing an indication of the starvation condition associated with the pending transaction at the target node.

31. The method of claim 28, wherein the first cache coherency protocol comprises a forward progress cache coherency protocol, and the second cache coherency protocol comprises a source broadcast cache coherency protocol.

32. The method of claim 28, wherein first type of conflict response permits the requester to complete the request for the data according to the second cache coherency protocol.

33. The method of claim 28, wherein second type of conflict response causes the requester to reissue the request for the data employing the first cache coherency protocol.

* * * * *

UNITED STATES PATENT AND TRADEMARK OFFICE
CERTIFICATE OF CORRECTION

PATENT NO. : 7,177,987 B2 Page 1 of 1
APPLICATION NO. : 10/760436
DATED : February 13, 2007
INVENTOR(S) : Stephen R. Van Doren et al.

It is certified that error appears in the above-identified patent and that said Letters Patent is hereby corrected as shown below:

In column 25, line 59, in Claim 1, after "node" delete ",".

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,177,987 B2 Page 1 of 1
APPLICATION NO. : 10/760436
DATED : February 13, 2007
INVENTOR(S) : Stephen R. Van Doren et al.

It is certified that error appears in the above-identified patent and that said Letters Patent is hereby corrected as shown below:

In column 25, line 59, in Claim 1, after "node" delete ",".

Signed and Sealed this

Second Day of December, 2008

JON W. DUDAS
*Director of the United States Patent and Trademark Office*